(12) United States Patent
Addink

(10) Patent No.: US 7,874,625 B2
(45) Date of Patent: Jan. 25, 2011

(54) BICYCLE WHEEL ASSEMBLY HAVING DISSIMILAR LATERAL SPOKE LACINGS

(75) Inventor: Brad J. Addink, Sun Prairie, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 102 days.

(21) Appl. No.: 12/204,237

(22) Filed: Sep. 4, 2008

(65) Prior Publication Data

US 2010/0052411 A1    Mar. 4, 2010

(51) Int. Cl.
    *B60B 1/02*    (2006.01)
(52) U.S. Cl. .......................... 301/56; 301/55
(58) Field of Classification Search ............... 301/6.5, 301/55, 56, 57, 58, 59, 67, 73, 104; 29/894.3, 29/894.33, 894.333; D12/205
    See application file for complete search history.

(56) References Cited

U.S. PATENT DOCUMENTS

| | | | |
|---|---|---|---|
| 5,228,756 A | 7/1993 | Krampera | |
| 5,445,439 A | 8/1995 | Dietrich | |
| 5,494,337 A | 2/1996 | Behnke | |
| 5,626,401 A | 5/1997 | Terry, Sr. et al. | |
| 6,158,819 A | 12/2000 | Okajima et al. | |
| 6,402,256 B1 | 6/2002 | Mercat | |
| 6,568,766 B1 | 5/2003 | Okajima et al. | |
| 6,722,743 B2 | 4/2004 | Meggiolan | |
| 7,393,063 B2 * | 7/2008 | Passarotto et al. | 301/55 |
| 7,425,041 B2 * | 9/2008 | Passarotto et al. | 301/55 |
| 7,651,172 B2 * | 1/2010 | Meggiolan | 301/110.5 |
| 7,658,452 B2 * | 2/2010 | Spahr et al. | 301/110.5 |
| 7,665,807 B2 * | 2/2010 | Passarotto et al. | 301/59 |
| 2002/0074853 A1 * | 6/2002 | Krampera | 301/55 |
| 2003/0067214 A1 | 4/2003 | Passarotto | |
| 2005/0012384 A1 | 1/2005 | Fioravanti | |
| 2006/0022513 A1 | 2/2006 | Passarotto et al. | |
| 2006/0103231 A1 | 5/2006 | Fioravantil | |
| 2006/0267398 A1 | 11/2006 | Muraoka et al. | |
| 2007/0090686 A1 | 4/2007 | Okajima et al. | |
| 2007/0145813 A1 | 6/2007 | D'Aluisio | |

FOREIGN PATENT DOCUMENTS

| | | |
|---|---|---|
| EP | 1 068 963 A2 | 1/2001 |
| EP | 1 122 091 A2 | 8/2001 |
| EP | 1 437 235 A2 | 7/2004 |
| EP | 0 786 360 B2 | 7/2005 |
| EP | 1 629 996 A1 | 3/2006 |
| EP | 1 629 997 A1 | 3/2006 |
| EP | 1 759 878 A1 | 3/2007 |

* cited by examiner

*Primary Examiner*—S. Joseph Morano
*Assistant Examiner*—Kip T Kotter
(74) *Attorney, Agent, or Firm*—Boyle Fredrickson, S.C.

(57) ABSTRACT

A bicycle wheel assembly having a number of spokes that extends between a hub and a rim. The wheel assembly includes a drive side that faces a chain and a non-drive side that is laterally spaced from the drive side. The spokes that extend between the hub and the rim on the drive side of the wheel assembly are oriented in a series of radial spokes and one-cross spoke pairs. Preferably, the drive side spokes are oriented in a repeating pattern. The non-drive side spokes are oriented in a repeating pattern wherein each spoke crosses more than one other non-drive side spoke. A wheel having such a spoke lacing pattern is lightweight and robust.

17 Claims, 5 Drawing Sheets

BICYCLE WHEEL ASSEMBLY HAVING DISSIMILAR LATERAL SPOKE LACINGS

BACKGROUND OF THE INVENTION

The present invention relates generally to bicycle wheels and, more particularly, to a bicycle wheel assembly having different spoke lacing patterns on the opposite lateral sides of the wheel.

Several aspects of bicycle operation rely on the construction of the bicycle wheel assembly. Commonly, a number of spokes extend between a hub and a rim. The spokes are generally constructed and oriented to support both radial and torsional loading of the wheel assembly. The spokes generally extend between flanges positioned at opposite sides of the hub to nipples that are supported at the rim. The spokes must be constructed and oriented to withstand the loading of the bicycle as well as for communicating the operating forces to the tire. In addition to the frequently linear driving and braking forces, the wheel assembly must also be able to withstand lateral forces commonly associated with turning operations as well as operation during windy conditions.

Commonly, spokes extend between the hub and the rim in either of a radial or a tangential manner. As is commonly understood, the tangential spokes communicate driving torques between the rim and the hub and limit the bending forces subjected to any radial spokes. The spokes of a tire assembly are commonly provided in two sets of spokes that extend from the rim to respectively opposite lateral sides of the hub. The sets of spokes are commonly referred to as drive side spokes, or spokes oriented nearest the gear cluster and/or chain, and non-drive side spokes, or those spokes laterally offset from the drive side spokes.

With respect to the drive side spoke set, bicycle drive systems have progressed to have an increasing number of gears associated with one or both of the hub and the sprocket. These gears accentuate the mechanical advantage associated with riding on steep inclines, strong winds, and/or well conditioned riders. As the number of gears associated with the hub increases, the hub flange nearest the hub gear cluster is displaced further inboard nearer the longitudinal centerline of the bicycle to provide the clearance necessary for the interaction of the chain with the gear cluster. Unfortunately, offsetting the drive side hub flange nearer the centerline of the bicycle reduces the lateral stiffness of the wheel and can result in an unbalanced condition with respect to the drive side and non-drive side spoke set tensions.

To address the difference in lateral stiffness with respect to the opposite lateral sides of the wheel assembly, some wheel assemblies increase the number of radial drive side spokes and/or simply have more drive side spokes than non-drive side spokes. Unfortunately, these solutions present their own drawbacks. Although radial spokes increase the lateral stiffness performance of a respective lateral side of a wheel assembly, the additional lateral spokes do not contribute to the efficient transfer a peddling and/or braking torque between the hub and the rim. Furthermore, increasing the number of spokes of the wheel assembly undesirably increases the overall weight of the wheel assembly.

Others have manipulated the cross-sectional shape of the rim to manipulate the angle that the spokes interact with the rim. Increasing the angle between the spoke and the centerline of the tire increases the angle of attack of the spokes and thereby improves the lateral bracing of the rim. A spoke bed, or the holes formed in the rim that cooperate with the spokes or nipples, is offset from a centerline of the rim such that the drive side spokes interact with the rim at a narrower angle than the non-drive side spokes. Such wheel assemblies have similar spoke patterns on the lateral sides of the wheel assembly although the spokes on the opposite lateral sides interact with the rim at different angles. Although such a construction forms a cost effective wheel and a wheel that is simple to service by having similar spokes on the opposite lateral sides of the wheel assembly, it is envisioned that a wheel assembly could be provided that has improved lateral stiffness performance, efficient transmission of power from the hub to the rim, and without unnecessarily increasing the weight of the wheel assembly.

Accordingly, it would be desirable to have a wheel assembly and method of forming a wheel that provides a bicycle wheel assembly that is lightweight, robust and efficiently communicates energy between the hub and the rim.

BRIEF DESCRIPTION OF THE INVENTION

The present invention provides a wheel assembly and method of forming a bicycle wheel that overcomes the aforementioned drawbacks. A bicycle wheel assembly according to one aspect of the invention includes a number of spokes that extend between a hub and a rim. The wheel assembly includes a drive side that faces a chain and a non-drive side that is laterally spaced from the drive side. The spokes that extend between the hub and the rim on the drive side of the wheel assembly are oriented in an alternating pattern of radial spokes and one-cross spoke pairs. The non-drive side spokes are oriented in a repeating spoke pattern wherein each spoke crosses more than one other spoke. Preferably, each non-drive side spoke crosses two or three other non-drive side spokes. The wheel assembly is lightweight and robust and exhibits desirable performance characteristics such as lateral stiffness.

Another aspect of the invention discloses a bicycle wheel assembly that includes a rim having a circular shape and constructed to support a tire and a hub. The hub has a first flange and a second flange that each extend radially outward from the hub. A first set of spokes extends from the first flange to the rim in a first repeating pattern. A second set of spokes extends from the second flange to the rim alternating between a second repeating pattern and a third repeating pattern.

As a further feature of the above aspects, each spoke of the first set of spokes crosses two other spokes as it extends between the hub and the rim. Preferably, these spokes are oriented on a non-drive side of the wheel assembly or a side of the wheel assembly generally opposite a chain.

Preferably, each spoke of the second repeating pattern extends radially between the hub and the rim without crossing any other spokes of the second set of spokes. More preferably, and in combination with one or more of the aspects above, each spoke of the third repeating pattern crosses one other spoke of the second set of spokes as it extends between the hub and the rim. Both the second and third sets of spokes are preferably positioned adjacent the chain.

A further aspect of the invention useable with one or more of the aspects described above includes a bicycle wheel having a hub with a pair of oppositely positioned flanges that are offset from one another and constructed to be supported by a bicycle frame. A number of first flange spokes extend between the first flange and a rim such that each spoke extending from the first flange crosses at least two other spokes extending from the first flange. A number of second flange spokes extend between the second flange and the rim and include a one-cross group of spokes that cross one other second flange spoke and radial group of spokes that extend between the second flange and the rim without crossing another second flange spoke.

Another aspect of the invention according to one or more of the aspects above includes a method of forming a bicycle wheel. A rim is provided with a pair of opposite facing side sections for receiving a tire. A hub is provided that has a first flange and a second flange that each extend radially from the hub. The first flange is further defined as being further from a longitudinal midpoint of the hub than the second flange. A first group of spokes are tensioned between the first flange and the rim such that each spoke crosses more than one other spoke. A second group of spokes is tensioned between the second flange and the rim such that some spoke of the second group of spokes extend radially between the rim and the hub and others of the second group of spokes cross one other spoke of the second group of spokes.

Each of the aspects above detail a bicycle wheel assembly that is lightweight and robust. The features of the invention described above accommodate differences in distances between the respective hub flanges and a rotational centerline of the wheel assembly so as to provide a wheel that is lightweight and exhibits desirable lateral stiffness.

These and various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
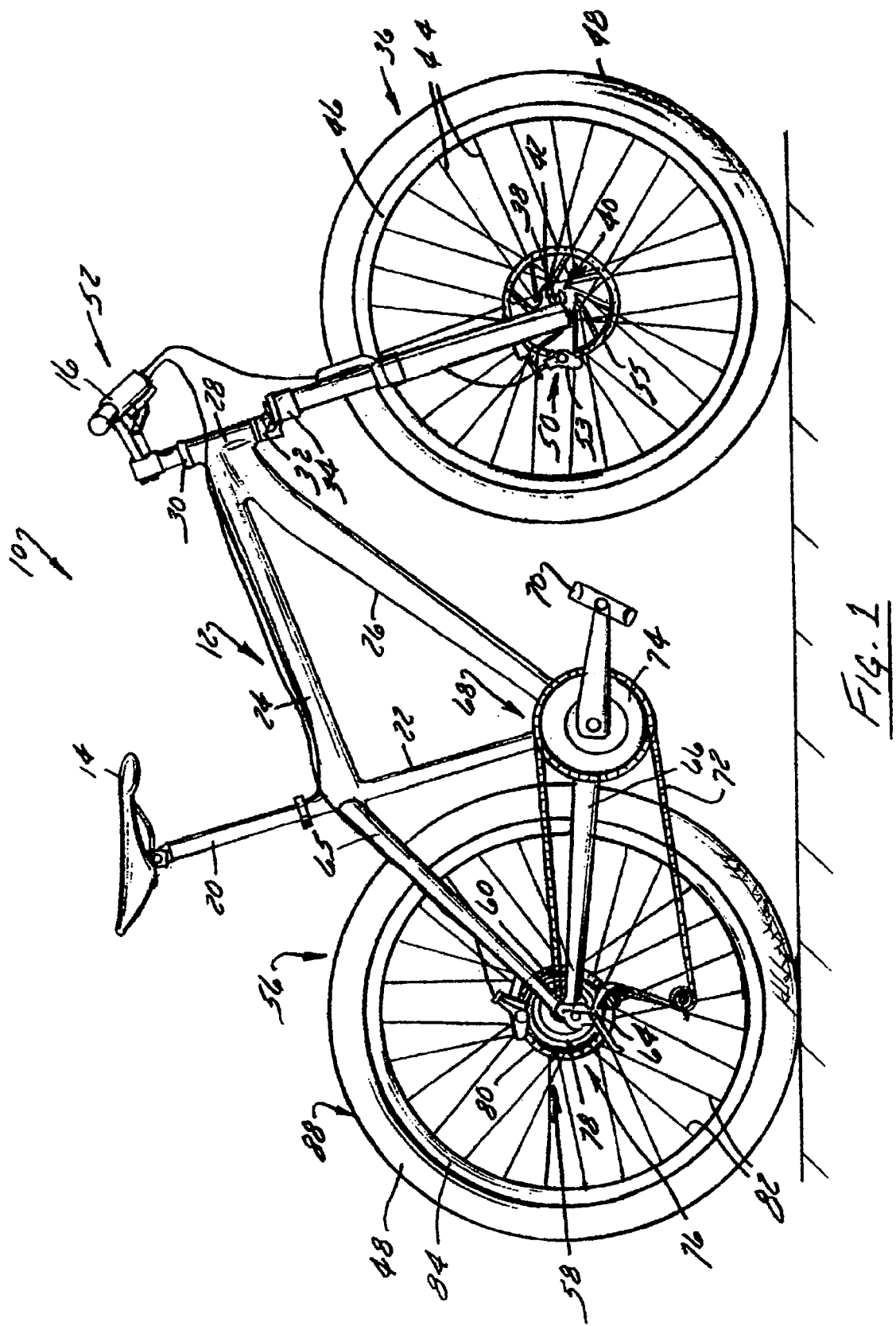
FIG. 1 is a side elevation view of a bicycle equipped with a rear wheel according to the present invention.

FIG. 1 shows a bicycle 10 having a frame 12 that is supported by one or more wheel assemblies 36, 56 constructed according to the present invention. Bicycle 10 includes a seat 14 and handlebars 16 that are attached to frame 12. A seat post 20 is connected to seat 14 and slidably engages a seat tube 22 of frame 12. A top tube 24 and a down tube 26 extend forwardly from seat tube 22 to a head tube 28 of frame 12. Handlebars 16 are connected to a stem 30 that passes through head tube 28 and engages a fork crown 32. A pair of forks 34 extend from generally opposite ends of fork crown 32 and are constructed to support front wheel assembly 36 at an end thereof or fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is positioned about rim 46 such that rotation of tire 48, relative to forks 34, rotates rim 46 and hub 42.

Bicycle 10 includes a front brake assembly 50 having an actuator 52 attached to handlebars 16 and a caliper 53 that engages generally opposite sides of a rotor or disc 55. Disc 55 is positioned proximate hub 42 of wheel assembly 36. Alternatively, bicycle 10 could be provided with a more traditional brake system wherein a caliper biases a pair of brake pads into engagement with rim 46. Regardless of the configuration of brake assembly 50 as a disc or rim brake, brake assembly 50 provides a stopping or slowing force to front wheel assembly 36. As shown in FIG. 1, rear wheel assembly 56 also includes a disc brake assembly 58. Disc brake assembly 58 includes a rotor 60 and a caliper 62 are positioned proximate a rear axle 64 associated with rear wheel assembly 56. Understandably, one or both of front wheel assembly 36 and rear wheel assembly 56 could be equipped with rim based or disc based braking systems. Rear wheel assembly 56 is positioned generally concentrically about a rear axle 64 such that rear wheel assembly 56 rotates about rear axle 64.

A seat stay 65 and a chain stay 66 offset rear axle 64 from a crankset 68. Crankset 68 includes a pedal 70 that is operationally connected to a chain 72 via a chain ring or sprocket 74. Rotation of chain 72 communicates a drive force to a rear section 76 of bicycle 10 having a gear cluster 78 positioned thereat. Gear cluster 78 is generally concentrically orientated with respect to rear axle 64 and includes a number of variable diameter gears.

Figure 2:
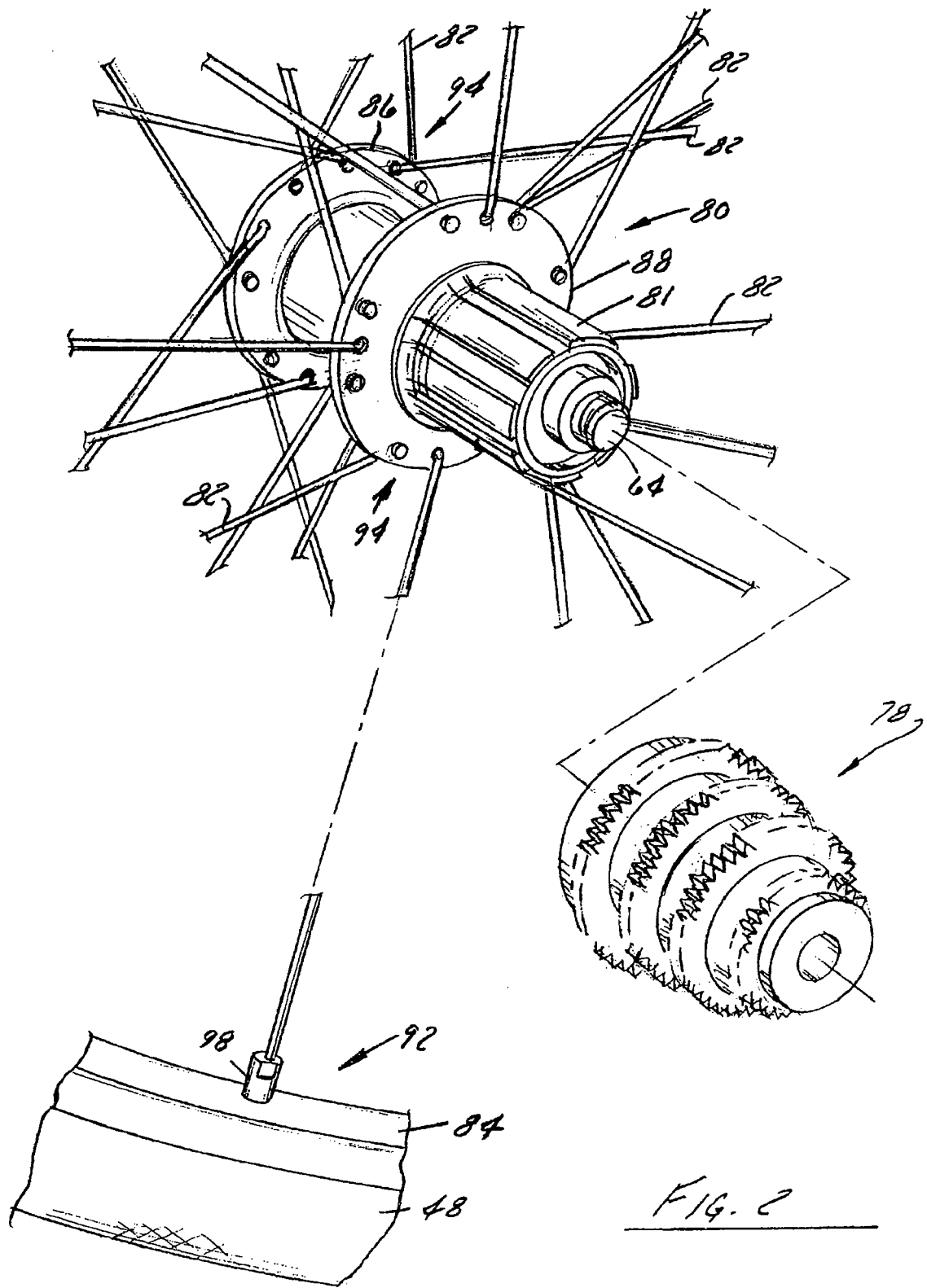
FIG. 2 is a perspective view of a hub portion of the rear wheel assembly shown in FIG. 1 removed from the bicycle and having a gear cluster exploded from the wheel assembly.

Referring to FIGS. 1 and 2, gear cluster 78 is operationally connected to a hub 80 of rear wheel assembly 56. Preferably, gear cluster 78 cooperates with a spline 81 so that hub 80 rotates with gear cluster 78. Rear wheel assembly 56 includes hub 80, a number of spokes 82, and a rim 84. Each spoke 82 extends between hub 80 and rim 84 and communicates a respective portion of the loading and operating forces therebetween. As is commonly understood, rider operation of pedals 70 drives chain 72 thereby driving rear wheel assembly 56 which in turn propels bicycle 10. Front wheel assembly 36 and rear wheel assembly 56 are constructed such that spokes 44, 82 communicate the forces associated with the loading and operation of bicycle 10 between hubs 42, 80 and rims 46, 84, respectively. The description set forth below further describes the construction of rear wheel assembly 56. It is appreciated that front wheel assembly 36 could be constructed in a similar fashion. It is further appreciated that bicycle 10 is shown as what is commonly understood as an off-road or mountain bike, or a bicycle configured for operation beyond paved terrain but that bicycle 10 could form what is commonly referred to as a road bike or a bicycle constructed for near exclusive operation on paved surfaces. It is appreciated that the following description of a bicycle wheel is applicable to both road and off-road bicycle constructions as well as front and rear wheel positions of such bicycles. Generally speaking, a number of bicycles may equally benefit from the present invention.

Figure 3:
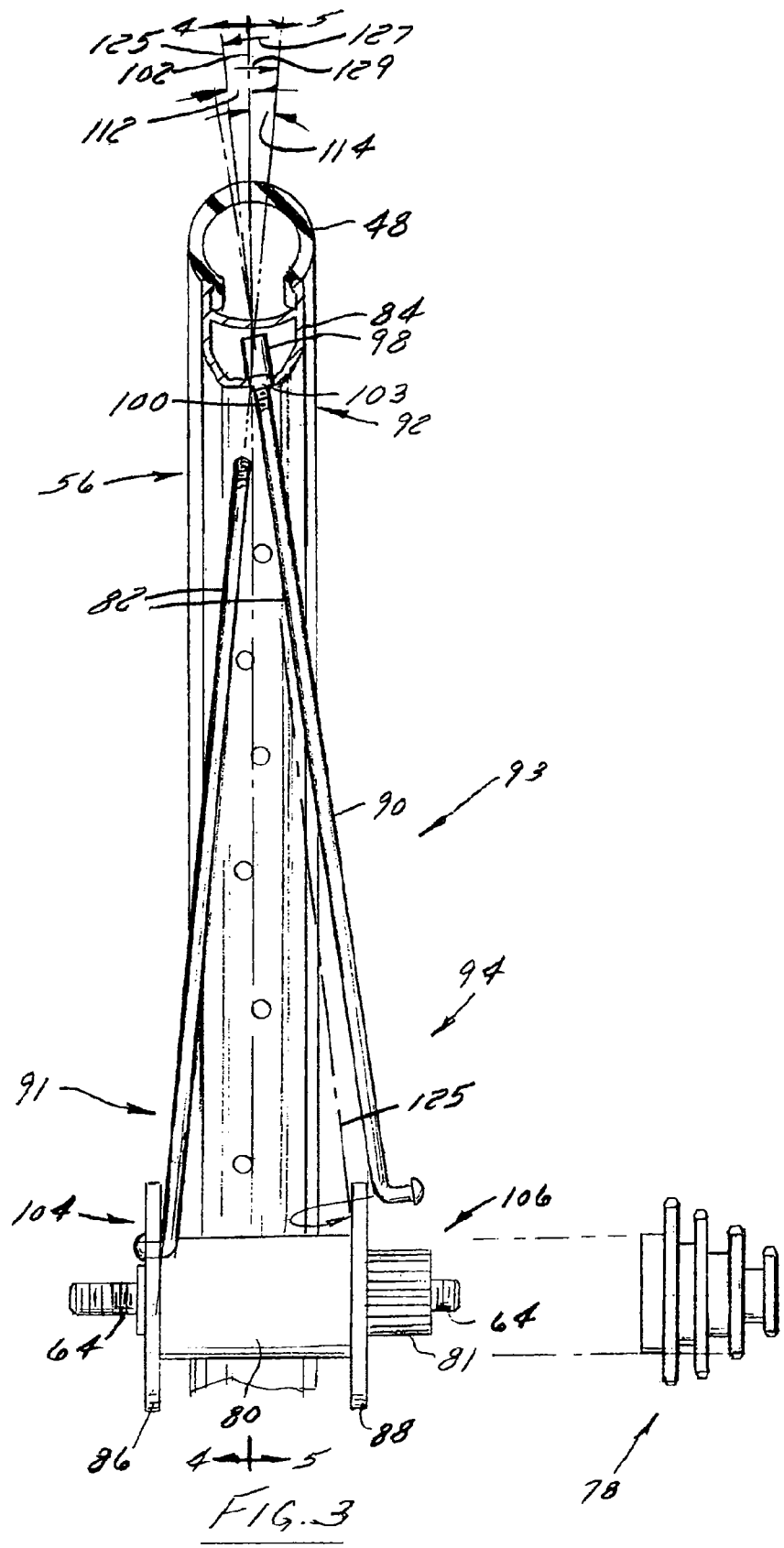
FIG. 3 is an elevation view of a radial portion of the wheel assembly shown in FIG. 2.

As shown in FIGS. 2 and 3, axle 64 extends beyond generally opposite spoke walls or flanges 86, 88 of hub 80 for attaching hub 80 to bicycle 10. Each spoke 82 includes a generally elongated body 90 that extends between a first end 92 and a second end 94 of the spoke 82. Preferably, body 90 is formed of a metal material such as aluminum, titanium, or alloys thereof. Understandably, spokes 82 could be constructed to any suitable material such as other metals, alloys, or carbon fiber based materials.

First end 92 of each spoke 82 is constructed to engage a nipple 98 that is engaged with rim 84. First end 92 includes a threaded portion 100 that is constructed to pass into and engage nipple 98. Each nipple 98 cooperates with an opening of hole 103 formed in rim 84 so as to secure first end 92 of each spoke 82 relative to rim 84. Understandably, other means of connecting spokes 82 to rim 84 are envisioned. For example, nipples 98 could be threadably secured to rim 84 and spokes 82 could be otherwise constructed with an enlarged portion that cooperates with a respective nipple. Alternatively, spokes 82 could be constructed to directly engage rim 84 and/or to allow tensioning of the spoke with the variable length connection provided at the connection with hub 80. Preferably, the ends of spokes 82 engage hub 80 and rim 84 in a radially and axially secure manner. More preferably, each spoke can be axially adjusted to provide a desired balanced tensioning of each spoke 82. Such axial adjustment can be provided via the connection with the respective ends of each spoke 82 and rim 84 and/or hub 80.

The second end 94 of each spoke 82 is engaged with one of flanges 86, 88. Flanges 86, 88 of hub 80 are further defined as a non-drive side flange 86 and a drive side flange 88, respectively, which are associated with a non-drive side 91 and a drive side 93 of wheel assembly 56. This designation is determined by the sides of the wheel and the respective flanges orientation proximate chain 72 of bicycle 10. As shown in FIG. 2, flange 88 is nearer spline 81 which cooperates with gear cluster 78 such that flange 88 provides the drive side flange in the embodiment shown. When assembled, flange 86 is farther from chain 72 and gear cluster 78 so as to be considered the non-drive side hub flange.

As shown in FIG. 3, wheel assembly 56 provides a plane of rotation, indicated by line 102, which is generally centrally disposed between a first lateral or sideways end 104 and a second lateral or sideways end 106 of wheel assembly 56. As used herein, the lateral direction of wheel assembly 56, and the spokes connected thereto, refer to those directions that extend in directions normal to the vertical centerline of the wheel assembly represented by plane 102. Flanges 86, 88 are not equidistant from plane 102. Non-drive side flange 86 is further from plane 102 than drive side flange 88. Gear cluster 78 offsets flange 88 nearer plane 102 than flange 86. As such, spokes 82 that extend from drive side flange 88 approach and interact with rim 84 at an angle, indicated by arrow 112, which is lower than an angle, indicated by arrow 114, of those spokes 82 that extend from non-drive side flange 86 as measured relative to vertical or plane 102. Said in another way, spokes 82 that extend from drive side flange 88 are oriented at a larger or steeper angle than spokes 82 extending from non-drive side flange 86 with respect to a horizontal plane or a longitudinal axis of axle 64. It should be noted that in the re resentation shown in FIG.3, the drive side spoke 82 is shown disengaged from drive side hub 88. For clarity, when spokes 82 that extend from drive side flange 88 are engaged with drive side flange 88, a longitudinal axis, indicated by line 125, of drive side spokes 82 are oriented at angle 112 as compared to angle 114 associated with non-drive side spokes 82. It should be apparent that when the respective drive and non-drive side spokes are secured between the hub and the rim, the spokes engaged with drive-side flange 88 are nearer vertical than the spokes engaged with non-drive side flange 86. Still referring to FIG. 3, it can be seen that when the drive side and non-drive side spokes are secured between hub 80 and rim 84, the drive side spokes are oriented at angle 112 having a lateral vector, indicated by line 127, which is oriented parallel to axle 64 that is less than a lateral vector, indicated b line 129 that is parallel to and in an opposite direction relative to vector 127. Angle 114 provides a larger bracing angle, or lateral angle of attack relative to lateral loading of wheel assembly 56, and allows those spokes 82 that extend from non-drive side flange 86 to rim 84 to better withstand lateral, or side-to-side loading of wheel assembly 56 with respect to a direction of travel of bicycle 10. Said in another way, non-drive side spokes are oriented nearer horizontal than the drive side spokes. The overall length of spokes 82, in addition to affecting torque force communication, also affects the lateral stiffness of the wheel assembly. At least some of spokes 82 are offset from a radial orientation and provide for the more efficient communication of torque forces between hub 80 and rim 84 than the same side radially oriented spokes.

Figure 4:
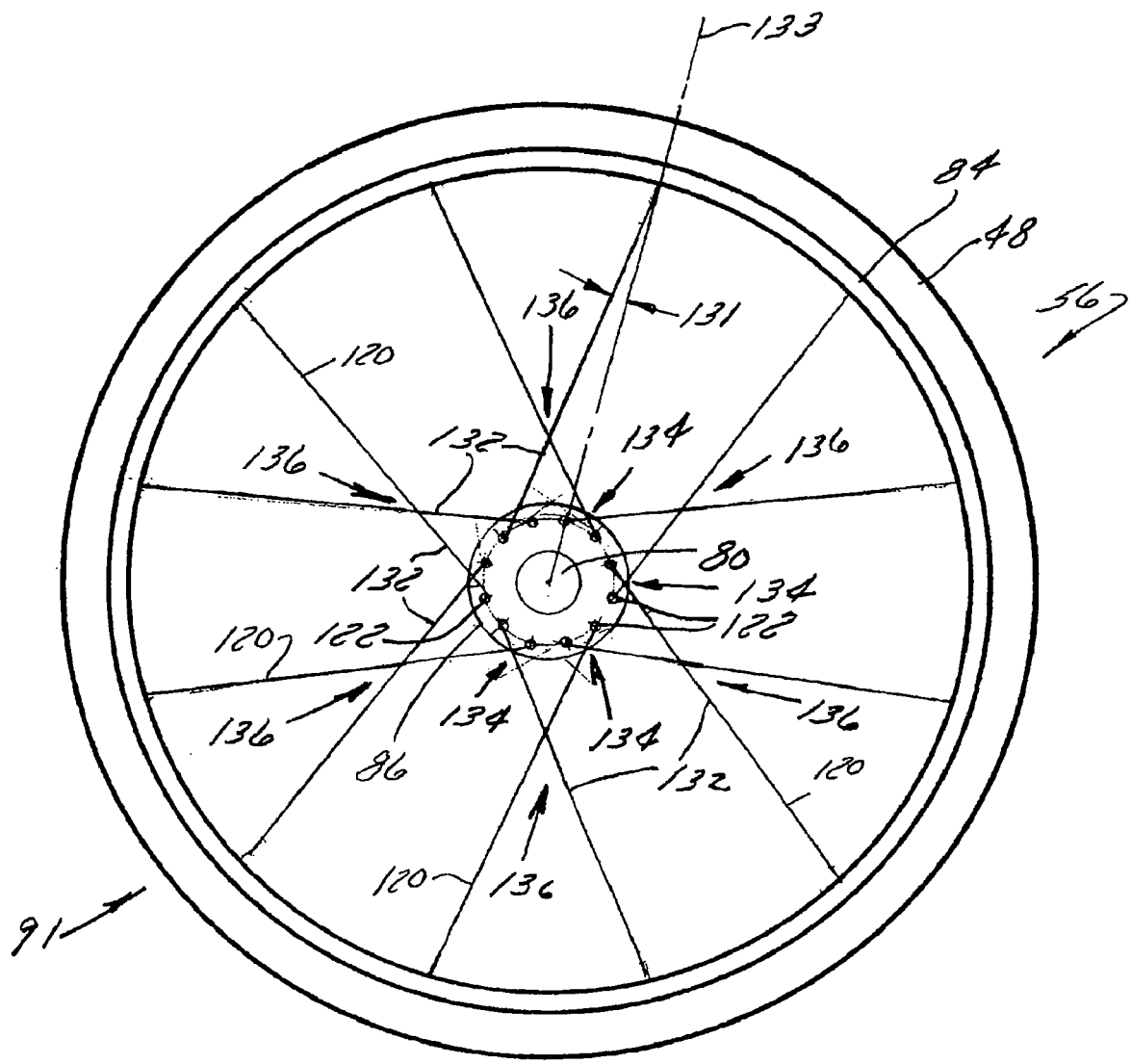
FIG. 4 is an elevation view of a non-drive side of the wheel assembly taken along line 4-4 shown in FIG. 3.
Figure 5:
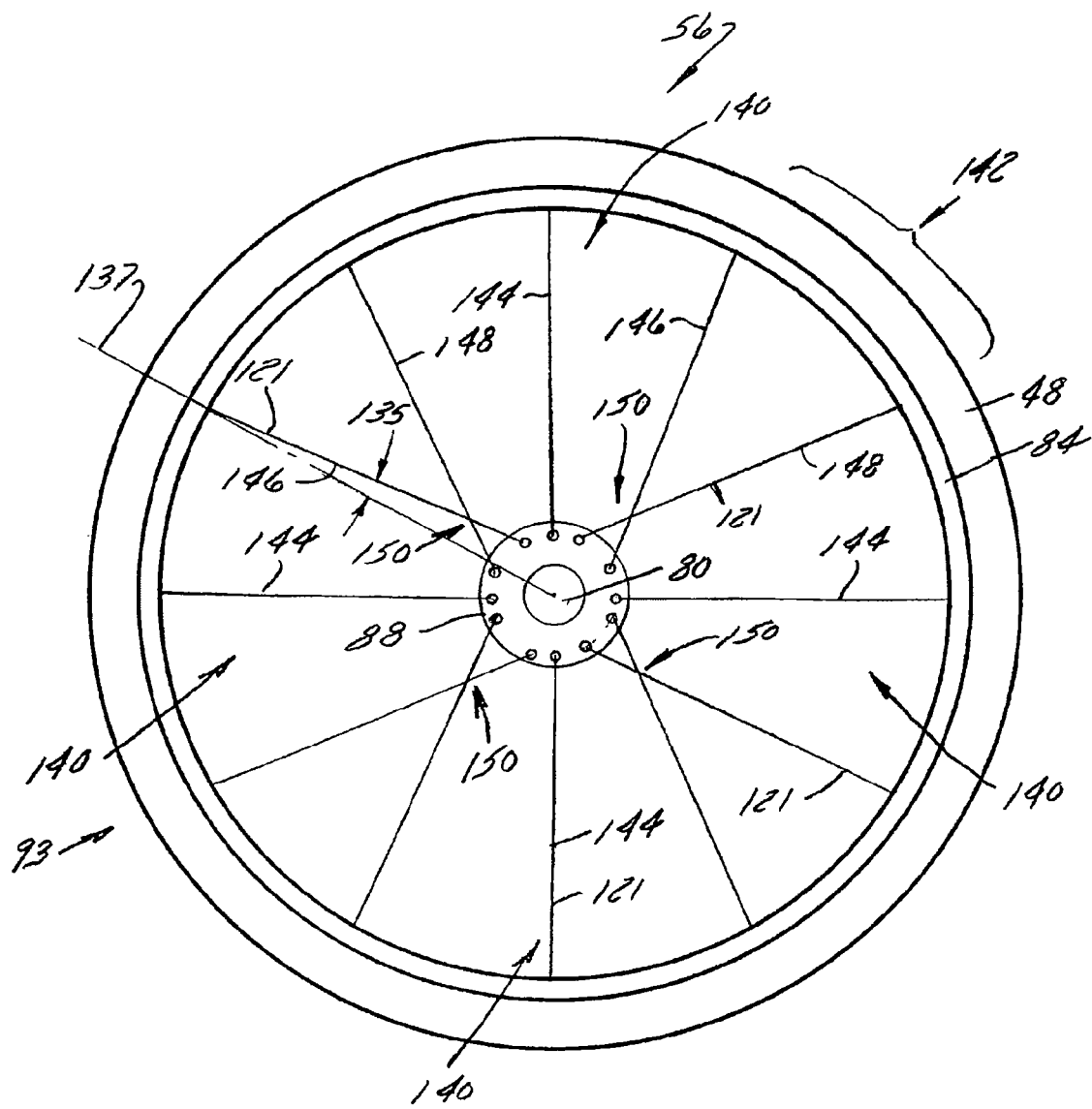
FIG. 5 is an elevational view similar to FIG. 4 of a drive side of the wheel assembly taken along line 5-5 shown in FIG. 3.

FIGS. 4 and 5 show respective groups of spokes that extend between each of flanges 86, 88 and rim 84, respectively. FIGS. 4 and 5 show the generally opposite lateral sides, and show the dissimilar spoke patterns, associated with the opposite lateral sides of wheel assembly 56. FIG. 4 is an elevation view of non-drive side 91 of wheel assembly 56 taken along line 4-4 shown in FIG. 3. Comparatively, FIG. 5 is an elevational view of drive side 93 wheel assembly 56 taken along line 5-5 shown in FIG. 3.

Referring to FIG. 4, non-drive side 91 of wheel assembly 56 includes a number of non-drive side spokes 120 that extend between non-drive side flange 86 and rim 84 of wheel assembly 56. Adjacent non-drive side spokes 120 pass in generally opposite directions though holes 122 in non-drive side flange 86 such that a portion of each adjacent spoke 120 flanks the generally opposite sides of non-drive side flange 86. Each non-drive side spoke 120 has a similar length and crosses two other spokes 120 as it extends between hub flange 86 to rim 84. Such a configuration offsets each of spokes 120 from a radial orientation thereby improving the ability of spokes 120 to communicate torsional loading between rim 84 and hub 80 along plane of rotation 102. As shown in FIG. 4, each non-drive side spoke 120 forms an angle, indicated by arrow 131, when viewed in a plane parallel to center plane 102 shown in FIG. 3, with a ray, indicated by line 133, that passes through the radial center of the wheel assembly and interface of spoke 120 with rim 84.

Spokes 120 are provided in spoke groups or pairs 132 that extend in a repeating pattern circumferentially about hub 80. A first cross 134 of each spoke 120 of each spoke pair 132 occurs near hub 80 and is formed by the crossing of spokes 120 of a respective spoke pair 132. A second cross 136 is located radially outward from first crosses 134 and is formed by the crossing of spokes 120 from different spoke pairs 132. As shown, each second cross 136 is formed by those spokes that are furthest apart with respect to adjacent spoke pairs 132. As stated above, the configuration of spokes 120 of non-drive side 91 of wheel assembly is applicable to either or both of front and rear wheel assemblies 36, 56 of bicycle 10. Additionally, it is further envisioned that non-drive side spokes 120 be oriented in other crossing patterns such as a three-cross configuration wherein each spoke crosses three other spokes as each spoke extends between the hub and rim of the wheel assembly.

Referring to FIG. 5, drive side 93 of wheel assembly 56 includes a number of drive side spokes 121 that are divided into a first group of drive side spokes 140 and a second group of drive side spokes 142. Unlike non-drive side 91 of wheel assembly 56, each spoke 121 of drive side 93 of wheel assembly 56 passes along a common side of hub flange 88. Understandably, spokes 120, 121 could be oriented to cooperate with a respective flange 86, 88 of hub 80 in different patterns or similar patterns but an alternate side of the respective flange 86, 88.

First group of drive side spokes 140 includes a number of spokes 144 that extend radially from hub flange 88 to rim 84 without crossing any other spoke 120 of drive side 93 of wheel assembly 56. Each second group of drive side spokes 142 includes a first drive side spoke 146 and a second drive side spoke 148. Drive side spokes 146 and 148 cross one another at a cross point 150 as they extend between drive side hub flange 88 and rim 84. First group of spokes 140 and second group of spokes 142 circumferentially rotate about drive side 93 of wheel assembly 56 in a generally repeating pattern. First group of spokes 140 and second group of spokes 142 are oriented in an alternating pattern about a circumference of hub 80. As shown, drive side 93 includes an equal number of first and second spoke groups 140, 142.

Radial spokes 144 of the drive side 93 of wheel assembly 56 are oriented to improve the lateral stiffness of wheel assembly 56. Spokes 146, 148 of second group of spokes 142 are oriented to contribute to the lateral stiffness of wheel assembly 56 and approach rim 84 so as to counteract a portion of the torsional loading of wheel assembly 56. Each of spokes 146, 148 is oriented at an angle, indicated by 135, when viewed in a plane parallel to plane 102 shown in FIG. 3, with a ray, indicated by line 137, that passes through the radial center of the wheel assembly and the interface of the respective spoke 146, 148 with rim 84. Comparing FIGS. 4 and 5, it should be apparent that angle 131 of non-drive side spokes 120 is greater than the angle 135 associated with drive side spokes. It should further be readily understood that angles 131, 135 are both greater than the negligible angle associated with the set of radial drive side radial spokes 144. As mentioned above, the spoke pattern of drive side 93 of wheel assembly 56 is applicable to both front and rear wheel assemblies, independent of the configuration of the bicycle for road or off-road use, and usable with both disc and rim brake systems.

Referring to FIGS. 4 and 5, the spokes 120, 121 of spoke groups 132, 140, 142 are oriented and cooperate in such a manner to reduce differences in spoke tension between non-drive side 91 and drive side 93 of wheel assembly 56. Preferably, the spoke lacing pattern associated with wheel assembly 56 provides no more than about a 30% difference in the spoke tension between non-drive and drive sides 91, 93 of wheel assembly 56. Although each lateral side 91, 93 of wheel assembly 56 includes a total of 12 spokes 120, 121, spokes 120, 121 of each side 91, 93 are oriented in dissimilar patterns such that wheel assembly 56 exhibits lateral stiffness values that are comparable with the respect to the opposite sides 91, 93 of wheel assembly 56. As described above with respect to both FIGS. 4 and 5, non-drive side spokes 120 are referable further from radially normal to rim 84 than drive side spokes 121 as evidenced in that angle 131 is larger than the angle 135 formed by the drive side ray 137 and the non-radial drive side spokes 121. Understandably, as each of spokes 144 is radially oriented with respect to the wheel assembly, angle 135 would be zero for each spoke of the first group of drive side spokes 140. As should be readily understood, the more non-radial orientation of non-drive side spokes 120 allows the non-drive side spokes 120 to accommodate a greater percentage of the total torque load between rim 84 and hub 80 of the wheel than drive side spokes 121.

Providing wheel assembly 56 with a total of 24 spokes reduces the mass associated with the wheel assembly. For example, the weight of a wheel commonly having 28 spokes and associated with withstanding a given loading can be reduced by approximately 25 grams by reducing the number of spokes and orienting the remaining spokes at different patterns with respect to the generally opposite lateral sides of the wheel assembly. Even though the spokes are not uniformly oriented with respect to the generally opposite lateral sides of the wheel, the spokes are laced in a manner wherein the wheel assembly 56 exhibits desirable lateral and torque loading characteristics. A wheel constructed in accordance with the present invention provides a wheel assembly 56 that is both lightweight and robust.

The present invention has been described in terms of the preferred embodiment, and it is recognized that equivalents, alternatives, and modifications, aside from those expressly stated, are possible and within the scope of the appending claims.

What is claimed is:

1. A wheel assembly constructed to be connected to a bicycle and rotate about an axis and along a plane of rotation, the wheel assembly comprising:
   a rim having a circular shape and constructed to support a tire;
   a hub having a first flange and a second flange that each extend radially outward from the hub, the first flange being oriented on a non-driven side of the hub and the second flange being oriented on a driven side of the hub;
   a first set of spokes extending from the first flange to the rim in a first repeating pattern; and
   a second set of spokes extending from the second flange to the rim alternating between a second repeating pattern and a third repeating pattern and wherein each spoke of the second repeating pattern extends radially between the hub and the rim without crossing any other spokes of the second set of spokes and wherein each spoke of the third repeating pattern crosses one other spoke of the second set of spokes as it extends between the hub and the rim.

2. The wheel assembly of claim 1 wherein each spoke of the first repeating pattern crosses two other spokes of the first set of spokes as it extends between the hub and the rim.

3. The wheel assembly of claim 1 wherein the first set of spokes is on a side of the wheel assembly generally opposite a chain.

4. The wheel assembly of claim 1 wherein the second set of spokes is generally adjacent a chain.

5. The wheel assembly of claim 1 further comprising a number of holes formed in the rim and oriented with respect to a centerline, each hole configured to secure a respective spoke of the rim such that the first set of spokes extend from the rim in a direction having a greater vector in a direction aligned with an axle that passes through the hub than the second set of spokes.

6. A bicycle wheel comprising:
   a hub having opposite sides that are constructed to be supported by a bicycle frame;
   a first flange and a second flange that are offset from one another along an axis of the hub, the first flange being on a non-driven side of the hub and the second flange being on a driven side of the hub;
   a number of first flange spokes extending between the first flange and a rim such that each spoke extending from the first flange crosses more than one other spoke extending from the first flange; and
   a number of second flange spokes extending between the second flange and the rim, the number of second flange spokes including a one-cross group of spokes that cross one other second flange spoke and a radial group of spokes that extend between the second flange and the rim without crossing another second flange spoke.

7. The bicycle wheel of claim 6 wherein the number of first flange spokes interact with the rim at a steeper lateral approach angle as measured from horizontal than the number of second flange spokes.

8. The bicycle wheel of claim 7 wherein the number of first flange spokes have a steeper radial approach angle with respect to a line that passes through an interface of a respective spoke with the rim and a radial center of the hub than the number of second flange spokes.

9. The bicycle wheel of claim 6 wherein the number of first flange spokes communicates a greater percentage of a torque load between the rim and the hub than the number of second flange spokes.

10. The bicycle wheel of claim 6 wherein there is about a 30% difference in tension loading between the number of first flange spokes and the number of second flange spokes.

11. The bicycle wheel of claim 6 wherein the bicycle wheel provides at least one of a front wheel and a rear wheel of a bicycle.

12. The bicycle wheel of claim 6 further comprising a gear set attached to the hub adjacent the second flange.

13. The bicycle wheel of claim 8 incorporated into one of road bike or an off-road bike.

14. A method of forming a bicycle wheel comprising:
providing a rim with a pair of opposite facing side sections for receiving a tire;
providing a hub having a first flange and a second flange that each extend radially from the hub and wherein the first flange is further from a longitudinal midpoint of the hub than the second flange and is further from a driven side of the hub than the second flange;
tensioning a first group of spokes between the first flange and the rim such that each spoke crosses at least two other spokes of the first group of spokes; and
tensioning a second group of spokes between the second flange and the rim such that some of the second group of spokes extend radially between the rim and the hub without crossing another spoke of the second group of spokes and others of the second group of spokes cross one other spoke of the second group of spokes.

15. The method of claim 14 further comprising providing a nipple for each spoke and forming a hole in the rim between each of the side sections for each nipple.

16. The method of claim 14 further comprising operatively engaging a gear cluster with the hub adjacent to and outboard of the second flange.

17. The method of claim 16 further comprising positioning the gear cluster such that the second flange is positioned between the gear cluster and the first flange.

* * * * *